United States Patent
Inoue et al.

(10) Patent No.: US 10,189,461 B2
(45) Date of Patent: Jan. 29, 2019

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Toshio Inoue, Gotemba (JP); Makoto Yamazaki, Gotemba (JP); Tomoaki Honda, Gotemba (JP); Hidekazu Nawata, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/606,751

(22) Filed: May 26, 2017

(65) Prior Publication Data

US 2018/0056971 A1    Mar. 1, 2018

(30) Foreign Application Priority Data

Aug. 26, 2016 (JP) ................................. 2016-165859

(51) Int. Cl.
| | |
|---|---|
| *B60W 10/26* | (2006.01) |
| *B60W 10/06* | (2006.01) |
| *B60W 10/28* | (2006.01) |
| *F16H 61/00* | (2006.01) |
| *F16H 61/02* | (2006.01) |
| *F16H 61/36* | (2006.01) |

(Continued)

(52) U.S. Cl.
CPC ............ *B60W 10/26* (2013.01); *B60W 10/06* (2013.01); *B60W 10/28* (2013.01); *F16H 61/0021* (2013.01); *F16H 61/0251* (2013.01); *F16H 61/36* (2013.01); *B60K 2006/268* (2013.01); *B60W 20/00* (2013.01); *F16H 2061/005* (2013.01); *F16H 2061/0015* (2013.01)

(58) Field of Classification Search
CPC ...... B60W 20/00; B60W 10/26; B60W 10/06; B60W 10/28; B60K 2006/268; B60K 6/20; B60K 6/22; B60K 6/42; F16H 61/36; F16H 61/0021; F16H 61/0251; F16H 2061/0015; F16H 2061/005
See application file for complete search history.

(56) References Cited

U.S. PATENT DOCUMENTS

| | | | |
|---|---|---|---|
| 5,287,831 A * | 2/1994 | Andersen ................ | F02P 19/02 123/179.3 |
| 9,074,575 B2 * | 7/2015 | Sakurai ............... | F02D 41/2432 |
| 9,421,846 B2 * | 8/2016 | Ono ...................... | B60H 1/004 |

(Continued)

FOREIGN PATENT DOCUMENTS

| | | |
|---|---|---|
| JP | 2005-002933 A | 1/2005 |
| JP | 2010-001765 A | 1/2010 |

*Primary Examiner* — Erez Gurari
(74) *Attorney, Agent, or Firm* — Hunton Andrews Kurth LLP

(57) ABSTRACT

A control device is configured to, in a case that an internal combustion engine is made to start up before travel start of a vehicle in a parked state, when an auxiliary battery has at least a predetermined value of battery voltage, make the internal combustion engine start up after executing fuel heating processing for heating fuel by glow plugs to which electric power is transmitted, or when the battery voltage of the auxiliary battery is less than the predetermined value, execute the fuel heating processing after executing charge processing for charging the auxiliary battery using a main battery and then start up the internal combustion engine.

5 Claims, 5 Drawing Sheets

(51) Int. Cl.
*B60K 6/26* (2007.10)
*B60W 20/00* (2016.01)

(56) References Cited

U.S. PATENT DOCUMENTS

| | | | | |
|---|---|---|---|---|
| 2008/0127940 | A1* | 6/2008 | Stephan | F02M 53/06 123/445 |
| 2008/0127951 | A1* | 6/2008 | Gale | F02D 41/20 123/549 |
| 2008/0275600 | A1* | 11/2008 | Rask | B60K 6/24 701/22 |
| 2009/0084618 | A1* | 4/2009 | Thompson | B60K 6/365 180/65.8 |
| 2009/0314260 | A1 | 12/2009 | Maeda et al. | |
| 2013/0087122 | A1* | 4/2013 | Kurtz | B60W 10/06 123/435 |
| 2014/0338376 | A1* | 11/2014 | Carpenter | B60L 1/003 62/115 |
| 2015/0330354 | A1* | 11/2015 | Choi | F02P 19/02 123/558 |
| 2015/0337776 | A1* | 11/2015 | Gerard | F02D 41/064 701/22 |
| 2016/0090081 | A1* | 3/2016 | Akita | B60W 20/40 701/22 |
| 2016/0108841 | A1* | 4/2016 | Kim | F02D 41/064 123/445 |
| 2016/0363107 | A1* | 12/2016 | Jang | F02N 11/06 |
| 2017/0096980 | A1* | 4/2017 | Jang | F02N 19/04 |
| 2017/0122150 | A1* | 5/2017 | Sutton | F01M 5/025 |
| 2017/0198655 | A1* | 7/2017 | Roos | F02D 41/06 |
| 2017/0306858 | A1* | 10/2017 | Ulrey | F02D 21/04 |
| 2018/0056971 | A1* | 3/2018 | Inoue | F16H 61/36 |

* cited by examiner

CONTROL DEVICE FOR HYBRID VEHICLE

TECHNICAL FIELD

The present invention relates to a control device for a hybrid vehicle, that is applied to a hybrid vehicle comprising both an internal combustion engine and an electric motor as power sources for propulsion.

BACKGROUND ART

There is known a technique that fuel is heated before start-up of an internal combustion engine in order to improve a start-up performance of the internal combustion engine. For example, there is known a control device which is configured to start heating fuel at the moment when detecting change a state of a vehicle from a locked door state to a unlocked door state (refer to Patent Document #1).

CITATION LIST

Patent Literature

Patent Document #1: Japanese Patent Publication 2005-002933 A.

SUMMARY OF INVENTION

Technical Problem

For heating the fuel, an electric fire or the like is used. Due to this, in a case that fuel heating is implemented before start-up of an internal combustion engine, the electric power of a battery mounted to the vehicle is consumed. Accordingly, if the fuel heating is implemented before the start-up of the internal combustion engine with the battery having a low voltage, electric power necessary for the start-up of the internal combustion engine is insufficient, and thereby the start-up performance of the internal combustion engine is deteriorated.

Accordingly, the object of the present invention is to provide a control device for a hybrid vehicle that is capable of suppressing deterioration of a start-up performance of an internal combustion engine.

Solution to Technical Problem

One aspect of the present invention provides a control device for a hybrid vehicle, the hybrid vehicle comprising: an internal combustion engine; an electric motor being enabled to function as a power source for propulsion; a main battery being electrically connected to the electric motor; a fuel heating device being enabled to heat fuel to be used for the internal combustion engine; and an auxiliary battery being enable to be charged by the main battery and supply electric power to the fuel heating device, wherein the control device includes a computer which by executing a computer program functions as: a heat controlling device configured to execute fuel heating processing where the fuel is heated with the fuel heating device; a charge controlling device configured to execute charge processing where the auxiliary battery is charged with the main battery; and a start-up controlling device configured to, in a case that the internal combustion engine is made to start up in a state that a start-up condition for which heating the fuel before start of travel of the vehicle in a parked state is necessary has been established, when the auxiliary battery has at least a predetermined value of battery voltage, make the internal combustion engine start up after making the fuel heating processing start, or when the battery voltage of the auxiliary battery is less than the predetermined value, make the fuel heating processing start after making the charge processing start and then make the internal combustion engine start up after the start of the fuel heating processing.

According to this aspect of the present invention, in a case that the battery voltage of the auxiliary battery is less than the predetermined value, firstly the charge processing for the auxiliary battery is started with the main battery, and then the fuel heating processing is executed. Accordingly, it is possible to ensure electric power necessary for the fuel heating processing by the charge processing. Thereby, it is possible to reduce a possibility of failure to start up the internal combustion engine, the failure caused by insufficient fuel heating processing because of insufficient electric power of the auxiliary battery. Further, it is possible to avoid the following situation. In a case that the battery voltage of the auxiliary battery lowers excessively because of the execution of the fuel heating processing, for example, it becomes impossible to implement control for starting up the internal combustion engine and electric power necessary for cranking the internal combustion engine becomes insufficient, and by reason that, the internal combustion engine is impossible to start up.

In one embodiment of the control device as one aspect of the present invention, the computer may function as the start-up controlling device configured to make the fuel heating processing and the charge processing start before making the internal combustion engine start up under a condition that a predetermined operation which is performed before the start of travel of the vehicle in the parked state is detected. According to this embodiment, the detection of the predetermined operation which should be performed before start of travel of the vehicle in a parked state is set as a start condition of the fuel heating processing and the charge processing. Thereby, it is possible to shorten user's waiting time for completion of the fuel heating processing and the charge processing ahead of the start of travel of the vehicle in a parked state.

In one embodiment of the control device as one aspect of the present invention, the internal combustion engine may be built so as to be enabled to be operated by using alcohol-containing fuel as the fuel, and the computer may further function as a determining device configured to determine whether or not the start-up condition has been established based on an alcohol density of the fuel and an environment temperature of the vehicle. The need to heat the fuel becomes higher as the volatility of the fuel is lower. In a case that the internal combustion engine is enabled to be operated by using alcohol-containing fuel, the volatility of the fuel changes by the alcohol density of the fuel and the environment temperature of the vehicle. According to this embodiment, it is determined based on the alcohol density of the fuel and the environment temperature of the vehicle whether or not the start-up condition for which heating fuel is necessary has been established, thereby it is possible to avoid unnecessary execution of the fuel heating processing.

In one embodiment of the control device as one aspect of the present invention, the computer may function as the start-up controlling device configured to set the predetermined value in compliance with at least one of; a relation that the predetermined value becomes larger as the alcohol density of the fuel is higher; and a relation that the predetermined value becomes larger as the environment temperature of the vehicle is lower. The volatility of the fuel becomes lower as the alcohol density is higher and the volatility of the fuel becomes lower as the environment temperature of the vehicle is lower. Accordingly, as the alcohol density is higher and as the environment temperature of the vehicle is lower, heat quantity increases, the heat quantity being applied to the fuel for ensuring the volatility of the fuel which is necessary far start-up, thereby electric power necessary for the fuel heating processing becomes larger. That is, as the alcohol density is higher, and as the environment temperature of the vehicle is lower, more electric power of the auxiliary battery is consumed by the fuel heating processing. According to this embodiment, the charge processing for the auxiliary battery is executed according to the electric power necessary for the fuel heating processing, thereby it is possible to avoid unnecessary execution of the charge processing.

In one embodiment of the control device as one aspect of the present invention, the computer may function as the start-up controlling device configured to set an end determination value in compliance with at least one of: relation that the end determination value becomes larger as the alcohol density of the fuel is higher; and a relation that the end determination value becomes larger as the environment temperature of the vehicle is lower, and end the charge processing in a case that the battery voltage has exceeded the end determination value larger than the predetermined value. According to this embodiment, the charge processing is executed in accordance with electric-power consumption of the auxiliary battery because of the execution of the fuel heating processing. Due to this, it is possible to provide efficient charge processing.

DESCRIPTION OF EMBODIMENTS

Figure 1:
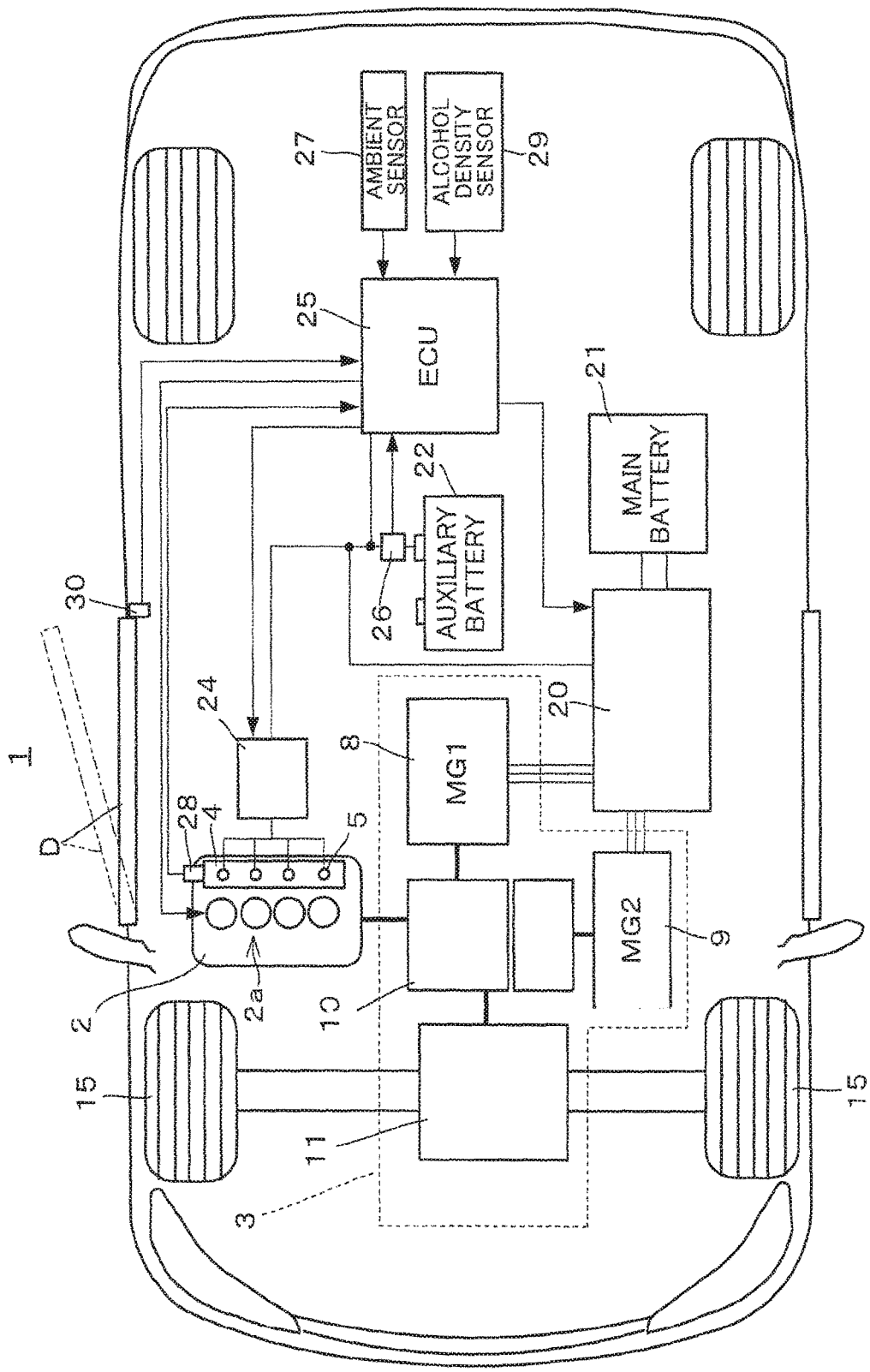
FIG. 1 is a diagram schematically showing a system configuration of a hybrid vehicle to which a control device according to one embodiment of the present invention is applied.

As shown in FIG. 1, a vehicle 1 is built as a series-parallel electric hybrid vehicle comprising an internal combustion engine 2 and a hybrid transaxle 3. The internal combustion engine 2 is an inline-four-cylinder internal combustion engine having four cylinders 2a. The internal combustion engine 2 is enabled to work by using alcohol-containing fuel. In general, a vehicle having an internal combustion engine which is enabled to work by using alcohol-containing fuel is called a flexible fuel vehicle (FFV). The internal combustion engine 2 is provided with a delivery pipe 4 which deliveries the fuel to each cylinder 2a. The delivery pipe 4 is provided with four glow plugs 5 capable of heating the fuel which his used in the internal combustion engine 2 so that the four glow plugs 5 are correlated to the four cylinders 2a respectively. Each of the glow plugs 5 corresponds to one example of a fuel heating device of the present invention.

The hybrid transaxle 3 includes two motor generators (a first motor generator 8 and a second motor generator 9), a power splitting mechanism 10 connected to the internal combustion engine 2 and the first motor generator 8 and built as a planetary gear mechanism, and a differential mechanism 11 which deliveries power outputted from the power splitting mechanism 10 to right and left drive wheels 15. These constituent elements included in the hybrid transaxle 3 are housed in a case not illustrated.

The power outputted from the internal combustion engine 2 is split by the power splitting mechanism 10. One of split powers by the power splitting mechanism 10 is used for generating electricity in the first motor generator 8, and the other one of split powers is transmitted to the differential mechanism 11. The second motor generator 9 is provided so as to transmit power to a power transmission passage running from the power splitting mechanism 10 to the differential mechanism 11.

Each of the motor generators 8 and 9 is electrically connected to a main battery 21 via an electric circuit 20 which functions as a DC-DC converter and an inverter respectively. The main battery 21 is built as, for example, a nickel hydride battery capable of having a comparatively high voltage, around 200 volt-DC. The electric circuit 20 is capable of increasing and converting into alternating-current power, direct-current power of the main battery 21, and supplying the alternating-current power to each of the motor generators 8 and 9. Also, the electric circuit 20 is capable of decreasing and converting into direct-current power, power generated by each of the motor generators 8 and 9, and supplying the direct-current power to the main battery 21. The first motor generator 8 or the second motor generator 9 corresponds to one example of an electric motor of the present invention.

The vehicle 1 is provided with an auxiliary battery 22 which is used as a power source for auxiliary machines such as various electric components. The auxiliary battery 22 is built as, for example, a lead battery capable of having lower voltage than the main battery 21, around 12 volt-DC. The auxiliary battery 22 is used as a power source for each glow plug 5, and the electric power of the auxiliary batter 22 is supplied to each glow plug 5 via a drive circuit 24. The auxiliary battery 22 is electrically connected to the main battery 21 via the electric circuit 20, and can be charged by the main battery 21.

The vehicle 1 is controlled by an electronic control unit (ECU) 25 built as a computer. The ECU 25 uses the auxiliary battery 22 as the power source for its operation. The ECU 25 controls an operation state of the internal combustion engine 2 of the vehicle 1, and also by operating the electric circuit 20, controls each of the motor generators 8 and 9. Further, the ECU 25 is capable of, by operating the drive circuit 24, executing fuel heating processing where the fuel is heated by each glow plug 5. Furthermore, the ECU 25 is capable of, by operating the electric circuit 20, executing charge processing where the auxiliary battery 22 is charted by using the main battery 21.

In order to execute the above mentioned control and processing, signals from various sensors, each detecting information of each portion of the vehicle 1, are inputted to the ECU 25. In the example shown, the vehicle 1 is provided with: a voltage sensor 26; an ambient temperature sensor 27; a fuel temperature sensor 28; an alcohol density sensor 29; and a door open/close sensor 30. The voltage sensor 26 outputs a signal according to the battery voltage of the auxiliary battery 22. The ambient temperature sensor 27 is provided on a not illustrated intake passage of the internal combustion engine 2. The fuel temperature sensor 29 outputs a signal according to a temperature of fuel in the delivery pipe 4. The alcohol density sensor 29 is provided on a not illustrated fuel path and outputs a signal according to an alcohol density of fuel. The door open/close sensor 30 outputs a signal when a state of a door D of the driver seat has changed to a closed state from an opened state. The signals output from those sensors are inputted to the ECU 25.

In the present embodiment, when the internal combustion engine 2 is made to start up ahead of start of travel of the vehicle 1 in a parked state, the ECU 25 executes the following control. Hereinafter, in reference to FIGS. 2 to 5 and the like, the control will be described. The ECU 25 holds a computer program for a control routine shown in FIG. 2 and reads to execute the computer program as appropriate. Even if in a parked state, the vehicle 1 is maintained in a state that its operations are available by use of the auxiliary battery 22 as a power source. In the present embodiment, "a parked state" means that a start switch, an ignition switch or the like of the vehicle 1 is in an off state, but does not mean a state of a so-called idling stop that when a vehicle speed becomes zero after a vehicle started traveling, the operation of the internal combustion engine 2 is stopped temporarily.

Figure 2:
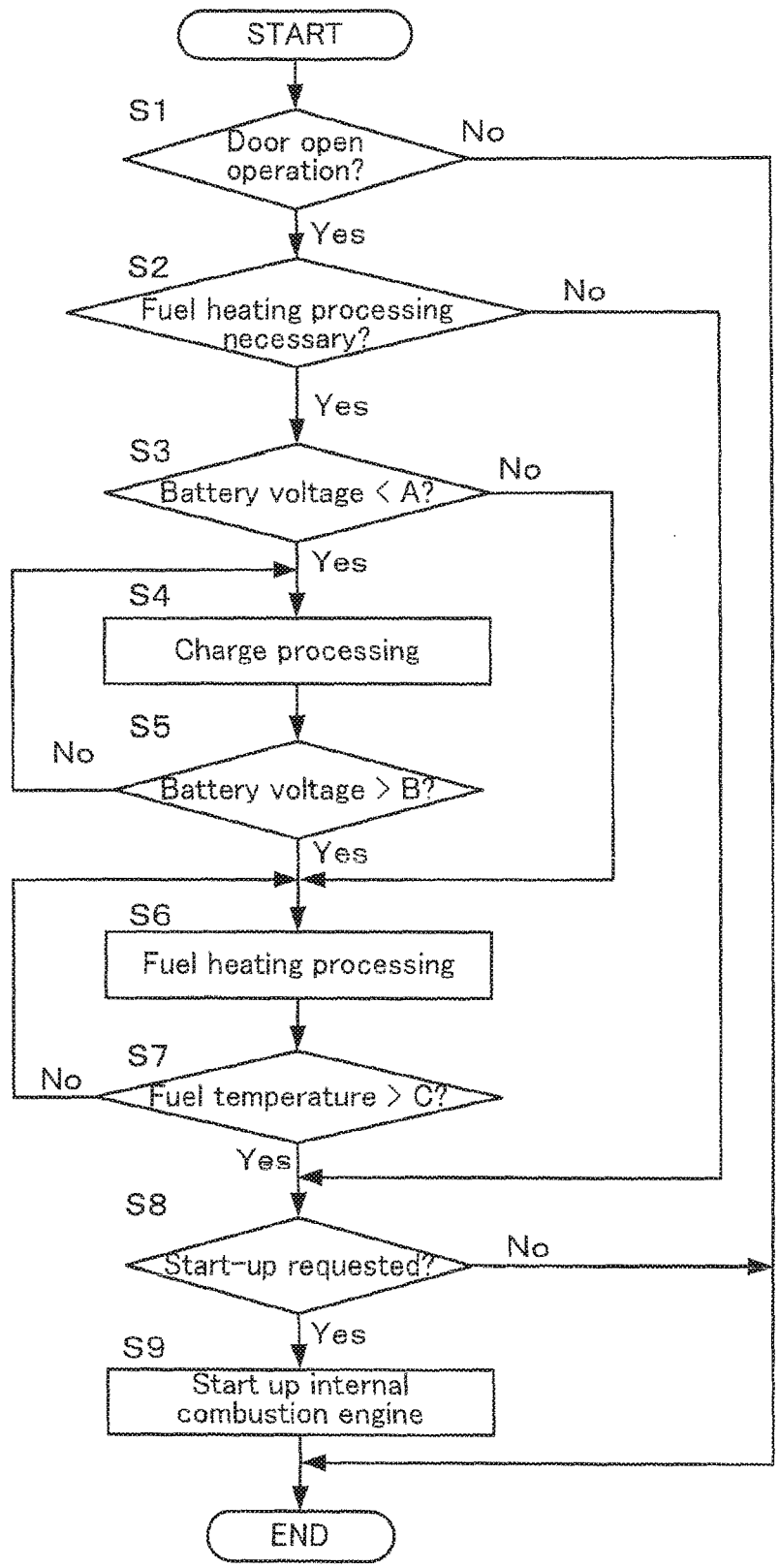
FIG. 2 is a flow chart showing one example of a control routine.
Figure 3:
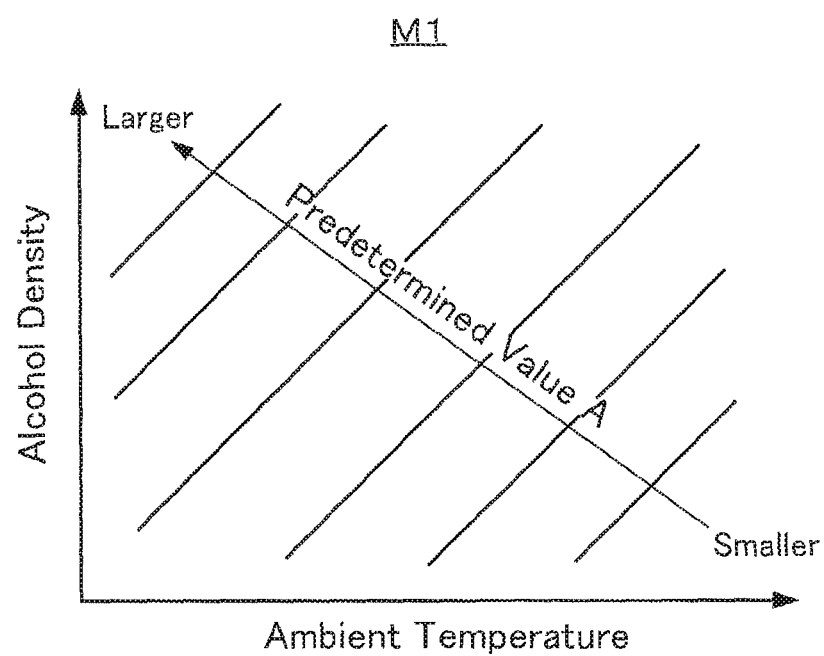
FIG. 3 is a diagram showing a calculation map for calculating a predetermined value.
Figure 4:
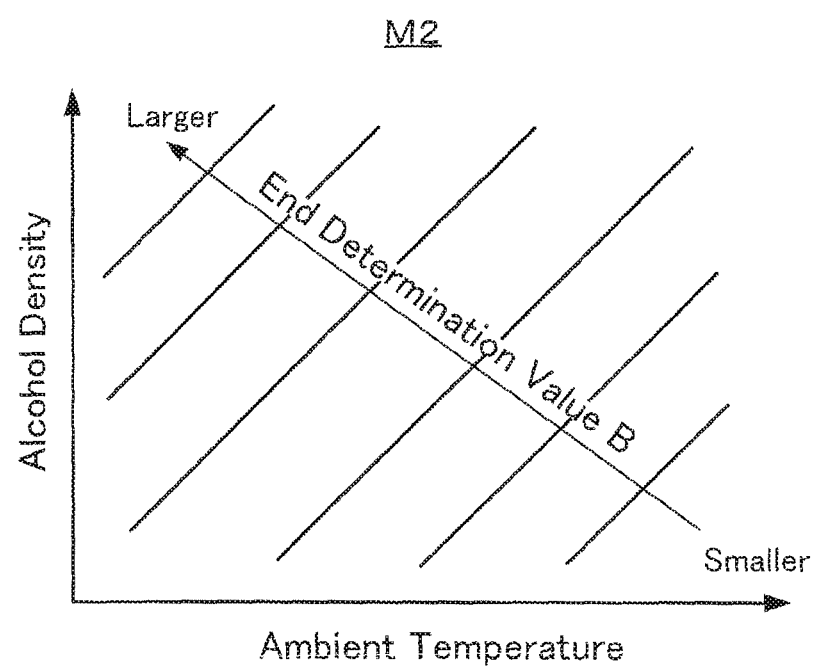
FIG. 4 is a diagram showing a calculation map for calculating an end determination value of charge processing.
Figure 5:
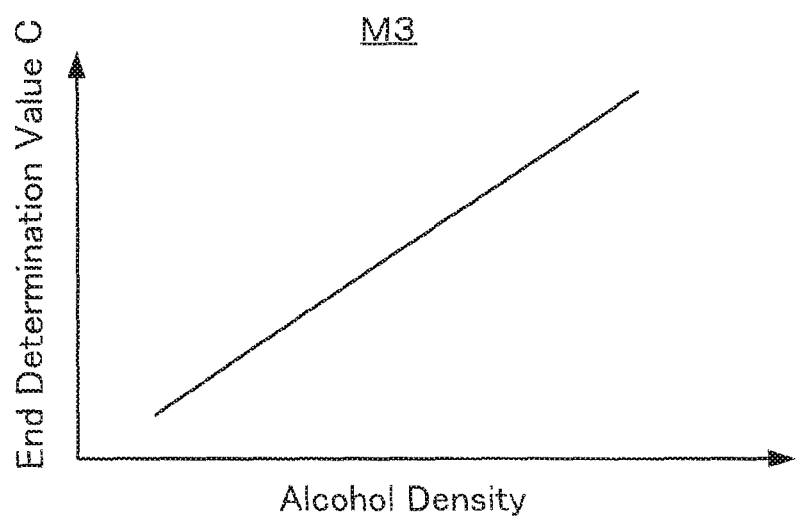
FIG. 5 is a diagram showing a calculation map for calculating an end determination value of fuel heating processing.

As shown in FIG. 2, at step S1, the ECU 25 refers to a signal output from the door open/close sensor 30 and determines whether the state of the door D of the driver seat has changed to the opened state from the closed state. In other words, the ECU 25 determined whether or not a door open operation for opening the door D of the driver seat of the vehicle 1 in a parked state has been detected. This door open operation corresponds to one example of a predetermined operation of the present invention. In a case that the door open operation has been detected, the ECU 25 advances to step S2. On the other hand, in a case that the door open operation has not been detected, the ECU 25 skips the following processing and ends the ongoing routine.

At step S2, the ECU 25 determines whether or not the fuel heating processing is necessary before start-up of the internal combustion engine 2. In a case that the fuel heating process is necessary, the ECU 25 advances to step S3, and in a case that the fuel heating process is unnecessary, the ECU 25 advances to step S8.

Whether or not the fuel heating processing is necessary is determined based on, as one example, the alcohol density and the ambient temperature which are parameters impinging on the volatility of fuel. The ambient temperature is one example of an environmental temperature of the vehicle 1. Concretely, whether or not the fuel heating processing is necessary is determined as follows. The ECU 25 acquires the alcohol density of the fuel by referring to a signal outputted from the alcohol density sensor 29 and also acquires the ambient temperature by referring to a signal outputted from the ambient temperature sensor 27. Then, the ECU 25 determines whether or not to execute the fuel heating processing based on threshold values set for the alcohol density and the ambient temperature respectively. The ECU 25 determines that the fuel heating processing is necessary, in a case that at least one of situations is established: a first situation that the alcohol density exceeds a first threshold value; and a second situation that the ambient temperature is equal to a second threshold value or less. In the present embodiment, the case that at least one of situations is established: the first situation that the alcohol density exceeds the first threshold value; and the second situation that the ambient temperature is equal to the second threshold value or less, corresponds to one example of a case that a start-up condition of the present invention is established. In this way, whether or not the fuel heating processing is necessary is determined based on the alcohol density of the fuel and the ambient temperature. Thereby, it is possible to avoid execution of unnecessary fuel heating processing.

The alcohol density of the fuel correlates with a deviation between a target value and a measurement value with respect to an air-fuel ratio in an air-fuel ratio control of the internal combustion engine 2. Accordingly, instead of measurement of the alcohol density with the alcohol density sensor 29 like the present embodiment, the alcohol density of the fuel may be acquired by an estimation based on the deviation. Further, as the environment temperature of the vehicle 1, instead of the ambient temperature, an engine temperature of the internal combustion engine 2, such as a coolant temperature, a lubricant oil temperature or the like, may be employed. Or, in a case that a device for measuring a temperature of the fuel is mounted, a fuel temperature may be employed, instead of the ambient temperature.

At step S3, the ECU 25 determines whether or not the battery voltage of the auxiliary battery 22 is less than a predetermined value A. In a case that the battery voltage is less than the predetermined value A, the ECU 25 advances to step S4. In a case that the battery voltage is equal to or more than the predetermined value A, the ECU 25 skips steps S4 and S5, and advances to step S6. The predetermined value A is a threshold for determining whether or not to execute later described charge processing for the auxiliary battery 22.

Although the predetermined value A may be a fixed value which does not change depending on situations, in the present embodiment the predetermined value A is set based on the alcohol density of the fuel and the ambient temperature so as to change according to the alcohol density of the fuel and the ambient temperature. For example, the ECU 25 calculates out the predetermined value A by referring to a calculation map M1 shown in FIG. 3. As apparent by the structure of the calculation map M1, the predetermined value A is set so as to become larger as the alcohol density of the fuel is higher and also become larger as the ambient temperature is lower. In a case much energy is required for the fuel heating processing, like a condition that the alcohol density is high and the ambient temperature is low, a large value is set as the predetermined value A. Accordingly, opportunities to execute the charge processing increase. And, it is possible to ensure the battery voltage appropriate for the heating processing to be executed after the charge processing. Thereby, it is possible to execute the charge processing appropriately for electric power necessary for the fuel heating processing. Further, in contrary to such a situation, in a situation that the alcohol density of the fuel is low and the ambient temperature is high, a small value is set as the predetermined value A and the opportunities to execute the charge processing decrease. Thereby, it is possible to avoid execution of unnecessary charge processing.

At step S4, the ECU 25 by operating the electric circuit 20, executes the charge processing for charging the auxiliary battery 22 using the main battery 21. The charge processing is continued until the battery voltage of the auxiliary battery 22 exceeds an end determination value B at step S5. The end determination value B is set to a value larger than the predetermined value A. In a case that the battery voltage has exceeded the end determination value B, the ECU 25 ends the charge processing to advance to step S6. Although the end determination value B may be a fixed value which does not change depending on situations, in the present embodiment the end determination value B is set based on the alcohol density of the fuel and the ambient temperature which is one example of the environment temperature of the vehicle 1. For example, the ECU 25 calculates out the end determination value B by referring to a calculation map M2 shown in FIG. 4. As apparent by the structure of the calculation map M2, the end determination value B is set, as with the predetermined value A, so as to become larger as the alcohol density of the fuel is higher and also become larger as the ambient temperature is lower. The end determination value B is set in this way. Thereby, in a case that large electric power of the auxiliary battery 22 is going to be consumed for the execution of the fuel heating processing, the auxiliary battery 22 is charged so that its battery charge remaining becomes large, and in a case that small electric power of the auxiliary battery 22 is going to be consumed, the auxiliary battery 22 is charged so that its battery charge remaining becomes small. That is, it is possible to execute the charge processing in accordance with the electric power consumption of the auxiliary battery 22 for the execution of the fuel heating processing. Due to this, the charge processing is made efficient.

At step S6, the ECU 25 executes the fuel heating processing for heating the fuel by operating the drive circuit 24 to transmit electric power to each glow plug 5. The fuel heating processing is continued until the fuel temperature exceeds an end determination value C at step S7. The ECU 25 acquires the fuel temperature by referring to a signal output from the fuel temperature sensor 28. Alternatively, the fuel temperature may be acquired by an estimation which is made based on the engine temperature of the internal combustion engine 2.

Although the end determination value C may be a fixed value which does not change depending on situations, in the present embodiment the end determination value C is set based on the alcohol temperature of the fuel. For example, the ECU 25 calculates out the end determination value C by referring to a calculation map M3 shown in FIG. 5. As apparent by the structure of the calculation map M3, the end determination value C is set so as to become larger as the alcohol density of the fuel is higher. Because, as the alcohol density is higher, the fuel temperature providing enough volatility becomes higher. Instead of step S7, the following processing may be executed: execution time of the fuel heating processing is determined in advance; and the ECU 25 ends the fuel heating processing under a condition that the execution time has elapsed. Further, the execution time may be changed according to the alcohol density and the ambient temperature.

At step S8, the ECU 25 determines whether or not there is a start-up request for starting up the internal combustion engine 2. For example, when detecting an operation to a not illustrated start switch provided to the vehicle 1, the ECU 25 determines that there is the start-up request. In a case that there is the start-up request, the ECU 25 advances to step S9, and in a case that there is no start-up request, the ECU 25 skips step 39 and ends the ongoing routine.

At step S9, the ECU 25 implements the fuel injection control and the ignition control, while cranking the internal combustion engine 2 by operating the electric circuit 20 to drive the first motor generator 8, in order to start up the internal combustion engine 2. Then, the ECU 25 ends the control routine shown in FIG. 2.

The ECU 25 functions as one example of a start-up controlling device of the present invention by executing the control routine shown in FIG. 2. Further, the ECU 25 functions as one example of a determining device of the present invention, one example of a charge controlling device of the present invention, and one example of a heat controlling device of the present invention, by executing the processing of step S2, step S4 and step S6 shown in FIG. 2 respectively.

According to the present invention, in a case that the battery voltage of the auxiliary battery 22 is less than the predetermined value A, the charge processing for the auxiliary batter 22 is started with the main battery 21 and after that, the fuel heating processing is executed. Accordingly, it is possible to ensure electric power necessary for the fuel heating processing by the charge processing. Thereby, it is possible to avoid a possibility of failure to start up the internal combustion engine 2, the failure caused by insufficient fuel heating processing because of insufficient electric power of the auxiliary batter 22. Further, it is possible to avoid a possibility the following situation. The battery voltage of the auxiliary battery 22 lowers excessively because of the execution of the fuel heating processing, and thereby, for example, the ECU 25 becomes inoperable and then the start-up of the internal combustion engine 2 becomes impossible.

In addition, in the present embodiment, by executing the processing of step S1 shown in FIG. 2, the fuel heating processing and the charge processing are started under a condition that the door open operation that the door D of the driver seat of the vehicle 1 in a parked state is opened has been detected. Thereby, it is possible to shorten user's waiting time for completion of the fuel heating processing and the charge processing ahead of start of travel of the vehicle 1.

The present invention is not limited to the above mentioned embodiment, and may be implemented in various embodiments in a range of a subject matter of the present invention. In the above mentioned embodiment, the internal combustion engine 2 is cranked for its start-up by using the first motor generator 8 electrically connected to the main battery 21. However, the present invention is not limited to this embodiment.

For example, the present invention may be also applied to a hybrid vehicle which is provided with a starter dedicated for start-up of the internal combustion engine 2, the starter using the auxiliary battery as a power source. Also in such an embodiment, in a case that the battery voltage of the auxiliary battery is less than the predetermined value, the heating processing is executed after the charge processing for the auxiliary battery is executed. Thereby, it is possible to avoid a possibility to fail to start up the internal combustion engine because of insufficient fuel heating processing. Further, it is also possible to avoid a possibility the following situation. The battery voltage of the auxiliary battery lowers excessively because of the execution of the fuel heating processing, and thereby, electric power necessary for cranking the internal combustion engine by the starter becomes insufficient and then the internal combustion engine is impossible to start up.

In the above mentioned embodiment, under the condition that the door open operation for opening the door D of the driver seat has been detected, the fuel heating processing and the charge processing are started. However, the present invention can be executed in an embodiment that the fuel heating processing and the charge processing are started without a condition that a predetermined operation, such as the door open operation, to be performed ahead of start of travel of a vehicle has been detected.

In the above mentioned embodiment, the door open operation as one example of the predetermined operation is detected. However, this embodiment may be changed to the other embodiment that the fuel heating processing and the charge processing are executed under a condition that any one of various operations, which should be performed before start of travel of a vehicle, such as unlocking the door D of the driver seat, sitting down on the driver seat, and getting in a driver seat of a vehicle, is detected as the predetermined operation.

In the above mentioned embodiment, after completion of the charge processing the fuel heating processing is started and after completion of the fuel heating processing the internal combustion engine is made to start up. However, the present invention may be also implemented in such an embodiment that the fuel heating processing is started before completion of the charge processing, or the internal combustion engine is made to start up before completion of the fuel heating processing. That is, the present invention can be applied to an embodiment where the fuel heating processing is started after start of the charge processing and the internal combustion engine is made to start up after start of the fuel heating processing.

In the above mentioned embodiment, the predetermined value for determining whether or not to execute the charge processing and the end determination value for determining whether or not to end the charge processing are set based on both of the alcohol density and, as one example of the environment temperature, the ambient temperature. However, it is mere one example that those values are set based on the alcohol density and the environment temperature. For example, the present invention may be implemented in such an embodiment where the predetermined value and the end determination value are set so as to become larger as the alcohol density is higher out of consideration of the environment temperature. On the contrary, the present invention may be also implemented in such an embodiment where the predetermined value and the end determination value are set so as to become larger as the environment temperature is lower out of consideration of the alcohol density. That is, in the present invention, the predetermined value and the end determination value may be set in compliance with at least one of: a relation that both of the values become larger as the alcohol density of the fuel is higher; and a relation that both of the values become larger as the environment temperature of the vehicle is lower.

In the above mentioned embodiment, the internal combustion engine is enabled to be operated by using alcohol-containing fuel. However, the present invention may be also implemented as a control device of a hybrid vehicle having a general gasoline-powered engine. In a case of the internal combustion engine which is enabled to be operated by using alcohol-containing fuel, the volatility of the fuel deteriorates as the alcohol density is higher, thereby the opportunities to heat the fuel increase in comparison with opportunities in a case that the general gasoline-powered engine is used. Accordingly, if the hybrid vehicle having such an internal combustion engine is set as a subject of the present invention, the effects of the present invention can be obtained more effectively.

This application claims the benefit of foreign priority to Japanese Patent Application No. JP2016-165859, filed Aug. 26, 2016, which is incorporated by reference in its entirety.

The invention claimed is:

1. An electronic control unit for a hybrid vehicle, the hybrid vehicle comprising:
   an internal combustion engine;
   an electric motor being enabled to function as a power source for propulsion;
   a main battery being electrically connected to the electric motor;
   a fuel heating device being enabled to heat fuel to be used for the internal combustion engine; and
   an auxiliary battery being enable to be charged by the main battery and supply electric power to the fuel heating device, wherein
   the electronic control unit is programmed to:
   execute fuel heating processing where the fuel is heated with the fuel heating device;
   execute charge processing where the auxiliary battery is charged with the main battery; and
   determine whether a voltage of the auxiliary battery is less than a predetermined value;
   determine whether a start-up condition has been established;
   wherein in response to a determination that the voltage of the auxiliary battery is not less than the predetermined value and a determination that the start-up condition has been established, the electronic control unit executes the fuel heating processing and then starts up the internal combustion engine in sequence; and
   wherein in response to a determination that the voltage of the auxiliary battery is less than the predetermined value and a determination that the start-up condition has been established, the electronic control unit executes the charge processing, executes the fuel heating processing, and then starts up the internal combustion engine in sequence.

2. The control device according to claim 1, wherein
   the electronic control unit is further programmed to execute the fuel heating processing and the charge processing starting up the internal combustion engine in response to detection of a predetermined operation which is performed before the start of travel of the vehicle when the vehicle is in a parked state.

3. The electronic control unit according to claim 1, wherein
   the internal combustion engine is built so as to be enabled to be operated by using alcohol-containing fuel as the fuel, and
   the electronic control unit is further programmed to determine whether or not the start-up condition has been established based on an alcohol density of the fuel and an environment temperature of the vehicle.

4. The electronic control unit according to claim 3, wherein
   the electronic control unit is further programmed to set the predetermined value in compliance with at least one of: a relation that the predetermined value becomes larger as the alcohol density of the fuel is higher; and a relation that the predetermined value becomes larger as the environment temperature of the vehicle is lower.

5. The electronic control unit according to claim 1, wherein
   the electronic control unit is further programmed to set an end determination value in compliance with at least one of: a relation that the end determination value becomes larger as the alcohol density of the fuel is higher; and a relation that the end determination value becomes larger as the environment temperature of the vehicle is lower, and end the charge processing in response to a determination that the battery voltage has exceeded the end determination value, wherein the end determination value is larger than the predetermined value.

* * * * *